US012498674B2

(12) United States Patent
Christan

(10) Patent No.: US 12,498,674 B2
(45) Date of Patent: Dec. 16, 2025

(54) PROTECTIVE RING FOR A HOROLOGY MOVEMENT AND HOROLOGY MOVEMENT INCLUDING SAID PROTECTIVE RING

(71) Applicant: ETA SA Manufacture Horlogère Suisse, Grenchen (CH)

(72) Inventor: Julien Christan, Bienne (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 371 days.

(21) Appl. No.: 17/863,640

(22) Filed: Jul. 13, 2022

(65) Prior Publication Data

US 2023/0100861 A1 Mar. 30, 2023

(30) Foreign Application Priority Data

Sep. 29, 2021 (EP) .................................... 21199919

(51) Int. Cl.
*G04B 43/00* (2006.01)

(52) U.S. Cl.
CPC ......... *G04B 43/002* (2013.01); *G04B 43/007* (2013.01)

(58) Field of Classification Search
CPC .... G04B 43/002; G04B 43/007; G04B 37/00; G04B 5/02
USPC .......................................................... 368/287
See application file for complete search history.

(56) References Cited

U.S. PATENT DOCUMENTS

| | | | | |
|---|---|---|---|---|
| 3,633,356 | A * | 1/1972 | Kitazima | G04B 37/052 368/299 |
| 2008/0273427 | A1 | 11/2008 | Zimmermann et al. | |
| 2013/0286798 | A1* | 10/2013 | Cattaneo | G04B 37/05 29/896.33 |
| 2015/0346692 | A1* | 12/2015 | Bolzt | G04B 37/04 29/244 |
| 2019/0187619 | A1* | 6/2019 | Wahler | G04B 37/0041 |
| 2021/0382439 | A1* | 12/2021 | Kim | G04B 47/046 |

FOREIGN PATENT DOCUMENTS

| | | | | |
|---|---|---|---|---|
| CH | 98832 | A | 4/1923 | |
| CH | 336757 | A | 2/1959 | |
| CH | 702655 | A2 * | 8/2011 | G04B 37/052 |
| CN | 101233458 | A | 7/2008 | |
| CN | 106930912 | A * | 7/2017 | |

(Continued)

OTHER PUBLICATIONS

European Search Report issued Feb. 25, 2022 in European Application 21199919.8 filed on Sep. 29, 2021, 3 pages (with English Translation of Categories of Cited Documents).

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

An antimagnetic and antishock protective ring for a horology movement, intended to be fixed to a horology movement, the ring including a tubular body extending between a first and a second axial end and is made of a material having ferromagnetic properties and wherein it is adapted to form, with the first axial end, a stop limiting the angular displacement about a radial axis of an oscillating mass connected to the horology movement.

11 Claims, 2 Drawing Sheets

(56) References Cited

FOREIGN PATENT DOCUMENTS

| | | | | |
|---|---|---|---|---|
| CN | 105814497 B | * | 5/2018 | ......... G04B 37/0033 |
| CN | 109991830 A | | 7/2019 | |
| EP | 0 958 529 A1 | | 11/1999 | |
| EP | 1557728 A2 | | 7/2005 | |
| EP | 2 458 456 A1 | | 5/2012 | |
| JP | 47-11270 U | | 10/1972 | |
| JP | 2009-503487 A | | 1/2009 | |
| JP | 2013-543983 A | | 12/2013 | |
| WO | WO 2007/012939 A1 | | 2/2007 | |

OTHER PUBLICATIONS

Office Action issued Sep. 5, 2023, in corresponding Japanese Patent Application No. 2022-126928 (with English Translation), 8 pages.
European Search Report issued Feb. 25, 2022 in European Application 21199919.8 filed on Sep. 29, 2021, citing documents AA-AB & AO-AT therein, 3 pages (with English Translation of Categories of Cited Documents).

* cited by examiner

PROTECTIVE RING FOR A HOROLOGY MOVEMENT AND HOROLOGY MOVEMENT INCLUDING SAID PROTECTIVE RING

CROSS-REFERENCE TO RELATED APPLICATION

This application claims priority to European Patent Application No. 21199919.8 filed on Sep. 29, 2021, the entire disclosure of which is hereby incorporated herein by reference.

TECHNICAL FIELD OF THE INVENTION

The invention relates to the field of horology and relates more particularly to a ring of a horology movement for protecting against magnetic fields and possible impacts from an oscillating mass. The present invention also relates to a horology movement including said protective ring.

The present invention applies to any mechanical or electronic horology movement comprising an oscillating mass intended to provide mechanical power in order to supply power to a driving member of a watch, more particularly for winding a mechanical horology movement or for supplying electricity to an electronic circuit via a generator.

TECHNOLOGICAL BACKGROUND

There are numerous solutions for protecting the horology movement of a watch from disturbances caused by exposure to magnetic fields.

The most effective of these solutions consist of inserting a horology movement into a case made from a ferromagnetic material.

However, this solution has the particular disadvantage of being relatively bulky and has a considerable impact on the mass of the watch, in addition to making the manufacture of the latter more complex.

Furthermore, in order to protect the horology movements from mechanical shocks, supports with a degree of elasticity allowing the absorption of mechanical stresses have been developed. These supports are interposed between the horology movement and middle of watches, so that they have the same disadvantages as those mentioned above.

Furthermore, these solutions do not protect the horology movements from possible impacts from the oscillating mass caused by an angular displacement generated during an impact on the watch.

It is understood here that there is no suitable solution for protecting a horology movement from the effects of magnetic fields as well as mechanical shocks.

SUMMARY OF THE INVENTION

The objective of the present invention is to provide a solution for protecting the horology movement of a watch both from the effects of magnetic fields and the possible impacts of the oscillating mass caused by shocks on the watch by overcoming the aforementioned disadvantages.

For this purpose, the invention relates to an antimagnetic and antishock protective ring for a horology movement, intended to be fixed to a horology movement. The ring comprises a tubular body extending between a first and a second axial end and is made from a material having ferromagnetic properties. It is adapted to form, by the first axial end, a stop limiting the angular displacement about a radial axis of an oscillating mass connected to the horology movement. The terms “radial axis” denotes an axis perpendicular to the axis of rotation of the oscillating mass.

Because of these features, the ring makes it possible to protect the horology movement both from the possible impacts of the oscillating mass when it is subjected, following a shock on the watch, to an angular displacement about an axis perpendicular to its axis of rotation, and from the effects of magnetic fields.

The ring also has the effect of supporting the oscillating mass in the event of a shock on the watch, in order to protect the elements that enable it to be attached to the horology movement from possible deformation or breakage.

Furthermore, the solution of the invention consists of a tubular ring, that latter takes up very little space within the horology movement. Another advantage resulting from the use of a tubular ring is the fact that possible impacts of the oscillating mass on the field of the ring are not visible or are barely visible to the naked eye because of the small transverse dimension of said field. The transverse dimension of said field forms the thickness of the body of the ring.

Furthermore, the ring is a monobloc, so that it can be easily manufactured at little expense. For example, the ring can be formed by stamping operations following by bending operations.

In particular embodiments, the invention can also include one or more of the following features, taken alone or in any technically possible combination.

In particular embodiments, the ring includes an axial kerf extending between the first and the second axial end of said ring, said axial kerf separating two longitudinal ends of said ring.

In particular embodiments, the axial kerf extends from the first or second axial end to the other.

In particular embodiments, the axial kerf extends from the first or second axial end to the other.

In particular embodiments, the axial kerf extends from the second axial end to the first axial end, a bridge of material connecting the two longitudinal ends of the ring together at the first axial end.

In particular embodiments, the ring includes fixing members extending from its second axial end, intended to be engaged in housings formed in the horology movement, so as to fix the ring to said horology movement.

In particular embodiments, the ring has elastic properties and is configured so as to be in a mechanically constrained state when the fixing members are engaged in the housings, so that said fixing members exert respectively clamping forces against said housings.

In particular embodiments, each fixing member has the form of a tongue, a first portion of which, referred to as the “proximal portion”, is oriented in axial direction in a direction opposite the first end of the ring and a second portion of which, referred to as the “distal portion”, connected to the proximal portion, extends in a radial plane of the ring and towards the outside thereof.

In particular embodiments, a fixing member is arranged diametrically opposite the axial kerf.

In particular embodiments, a fixing member is arranged at each of the longitudinal ends of the ring.

In particular embodiments, the ring comprises a chamfer at the junction between its first axial end and each of its longitudinal ends.

In particular embodiments, the ring includes a fixing member in the form of a radial collar extending from the second end, intended to be arranged to bear against the horology movement.

According to another subject-matter, the present invention relates to a horology movement comprising a cage formed by a plate onto which a bridge assembly is fixed, and an oscillating mass mobile in rotation relative to said cage and extending radially beyond the bridge assembly.

The horology movement further includes a ring as described above, configured to encircle the bridge assembly and to extend axially towards the oscillating mass.

Advantageously, the present invention makes it possible to assemble the horology movement assembly before introducing said horology movement into a middle of a watch, due to the design of the ring which allows for contained dimensions of the latter.

In particular embodiments, the plate forms, by a surface referred to as the "lower face", a radial shoulder with respect to the bridge assembly, with housings receiving the fixing members being made on said lower face.

In particular embodiments, the fixing members are welded to housings, for example by laser.

In particular embodiments, the fixing members are bonded to the housings.

In particular embodiments, the fixing members cooperate with the housings by elastic interlocking.

BRIEF DESCRIPTION OF THE FIGURES

Other features and advantages of the invention will become apparent from the following detailed description, given by way of example and by no means limiting, with reference to the attached drawings in which.

DETAILED DESCRIPTION OF THE INVENTION

Figure 1:
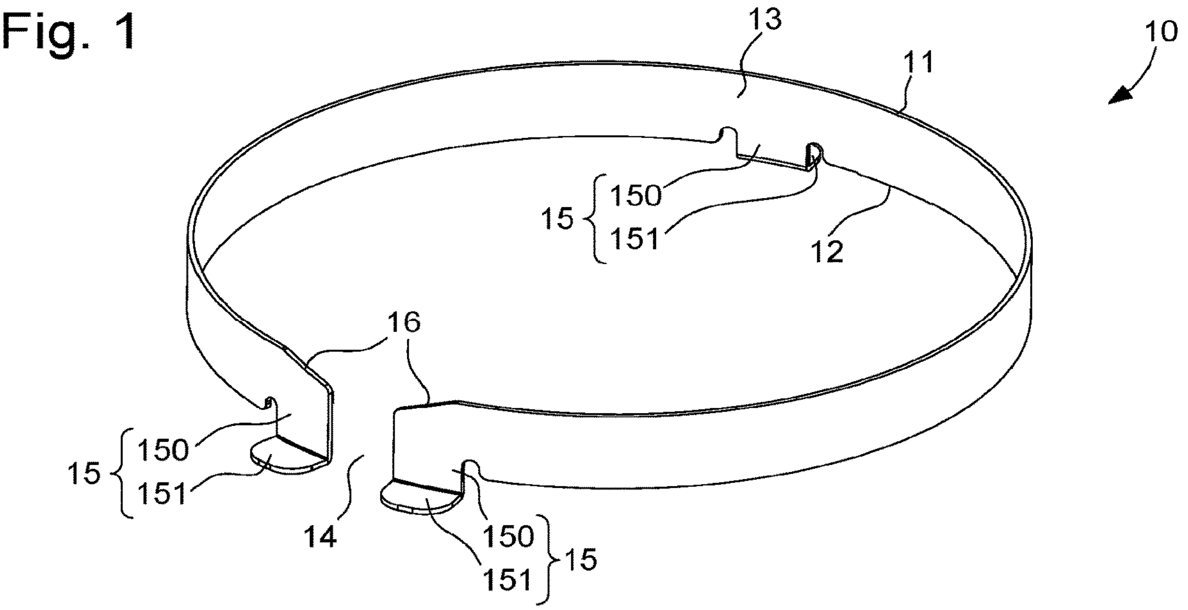
FIG. 1 shows a perspective view of a preferred example of a ring according to the present invention.

FIG. 1 shows an antimagnetic and antishock protective ring 10 for a horology movement 20, according to a first aspect of the present invention.

Figure 2:
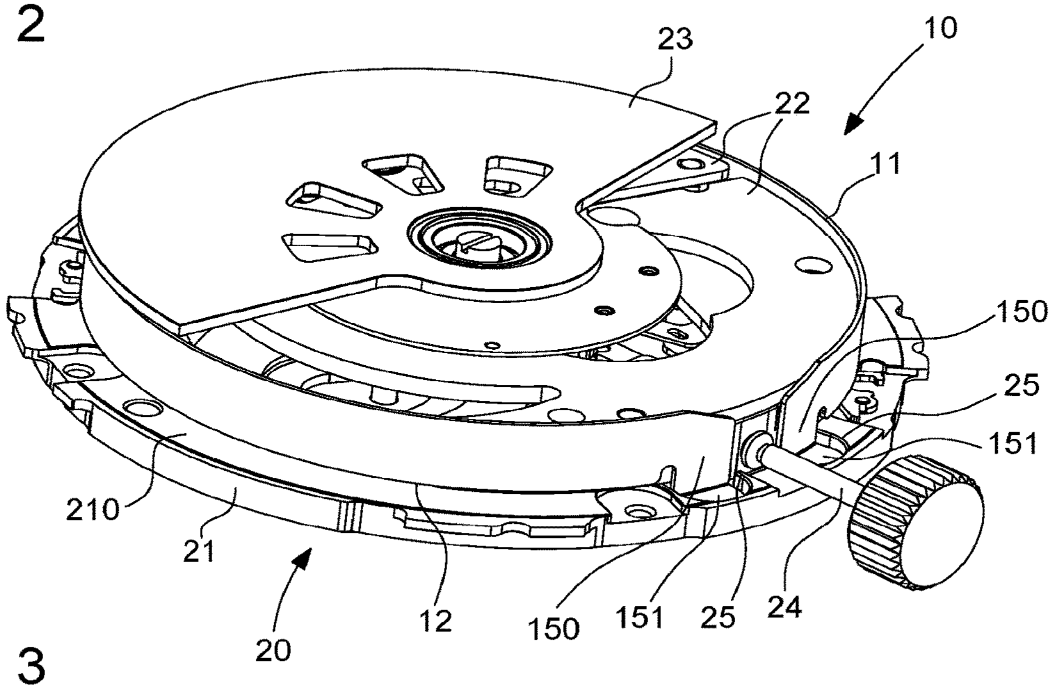
FIG. 2 shows a perspective view of a horology movement including the ring of FIG. 1.
Figure 3:
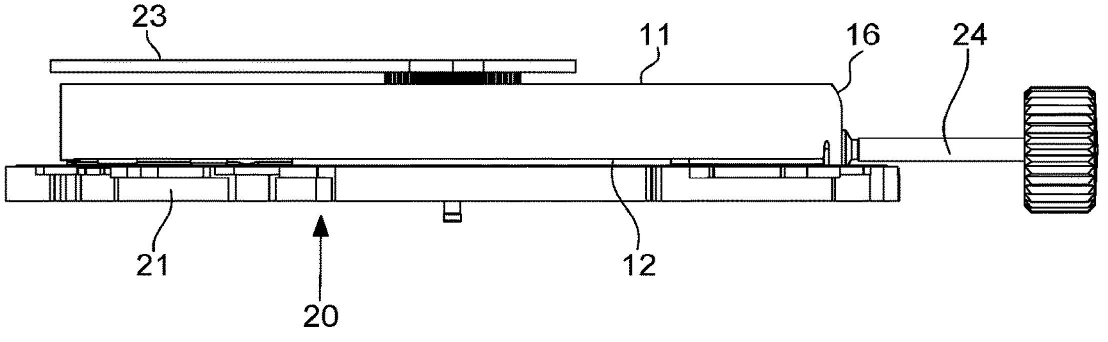
FIG. 3 shows a side view of the horology movement of FIG. 2.

The ring 10 is intended to be fixed against a horology movement 20, as shown in FIGS. 2 and 3, itself intended to be housed in an inner volume of a middle of a watch case (not shown).

The horology movement 20 includes an oscillating mass 23 which is mobile in rotation and adapted to supply energy to a member of the horology movement 20, such as a barrel or a generator, depending on whether the horology movement is of the mechanical type or the electronic type, in a manner known to the person skilled in the art.

The ring 10 comprises a tubular body, extending axially between two ends, referred to respectively as "first and second axial ends" 11 and 12 in the following text. The ring body 10 has an inner face 13 intended to be arranged opposite a cage of the horology movement 20. In the preferred embodiment of the invention represented in the figures, the body of the ring 10 has a substantially circular cross-section.

More precisely, the cage of the horology movement 20 includes, in a manner known per se to a person skilled in the art, a plate 21 onto which a bridge assembly 22 is fixed. The ring 10 is configured, as shown in particular in FIGS. 2 and 3, so as to encircle the bridge assembly 22 of the horology movement 20. In other words, the ring 10 is configured such that the inner face 13 of the body of the ring 10 is arranged opposite the periphery of the bridge assembly 22.

It should be noted that the components of the horology movement 20, other than the cage and the oscillating mass 23, are not described in the present text as they are well known to a person skilled in the art and as such do not relate to the present invention.

The ring 10 is advantageously made from a material with ferromagnetic properties, so as to have high permeability to magnetic fields. Such a material can consist of soft iron. Thus, the ring 10 makes it possible to channel the magnetic field lines surrounding the horology movement 20, and therefore give it protection from the effects of said magnetic fields.

As shown in FIGS. 1 and 2, the ring 10 can advantageously include, in the preferred embodiment of the invention, an axial kerf 14, for example traversing radially, extending between the first and second axial ends 11 and 12 of said ring 10. The axial kerf 14 separates two longitudinal ends of said ring 10 arranged opposite one another.

One advantage of the axial kerf 14, when it passes through, as shown in the figures, is that it allows the passage of a setting or winding stem 24, or a push button or more generally any other control member connected to the horology movement 20.

In the preferred example shown in FIGS. 1 to 3, the axial kerf 14 extends from one of the first and second axial ends 11 and 12 to the other. The axial kerf 14 can therefore pass through axially.

The axial kerf 14, whether it is passes through or not, helps give elastic properties to the ring 10. More particularly, the ring 10 can advantageously be deformed elastically so as to vary the distance separating the two longitudinal ends of the ring 10. Indeed, even if it is does not pass through, the axial kerf 14 constitutes a weakened area giving the ring 10 a certain mobility.

Such a feature contributes in particular to facilitating the attachment of the ring 10 to the horology movement 20, as described in more detail below.

Figure 4:
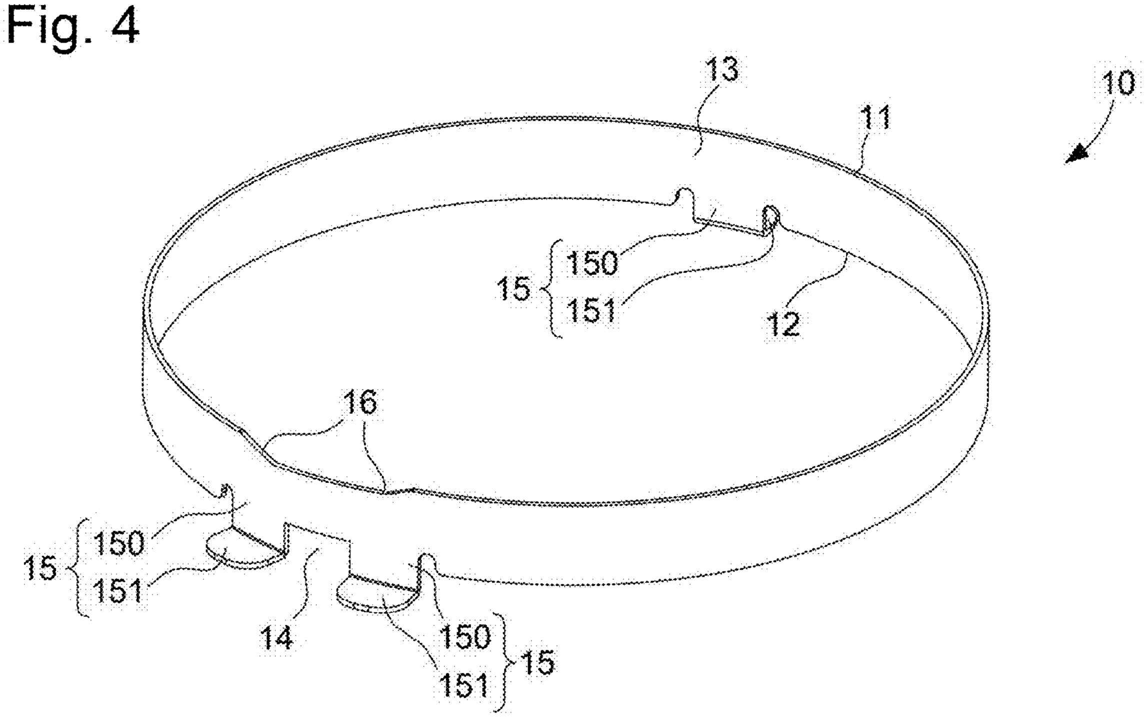
FIG. 4 shows a perspective view of a modified example of a ring.

In an embodiment shown in FIG. 4, the axial kerf 14 can only extend from the second axial end 12 towards the first axial end 11, a bridge of material connecting the two longitudinal ends of the ring 10 to each other at the first axial end 11.

Also in this embodiment, the axial kerf 14 helps to impart elastic properties to the ring 10.

In other embodiments of the invention, the ring 10 can include a plurality of axial kerfs 14 spaced apart from one another or at a distance from one another.

When the ring 10 is fixed to the horology movement 20, its first axial end 11 is intended to rest opposite the oscillating mass 23 and its second axial end 12 is intended to rest opposite the plate 21, as illustrated in FIGS. 2 and 3.

More particularly, when it is fixed to the horology movement 20, the ring 10 is adapted to form, with its first axial end 11, a stop limiting the angular displacement of the oscillating mass 23 about an axis perpendicular to its axis of rotation, such that said oscillating mass 23 cannot come into contact with a bridge of the bridge assembly 22 of the horology movement 20, so as to maintain a possible deformation or a possible breakage, the elements allowing the fixing of said oscillating mass 23 to the horology movement 20.

In other words, the oscillating mass 23 is likely to impact the field of the ring 10.

Such a displacement can be generated when the horology movement 20, and more particularly the watch which comprises it, is subjected to a shock, in particular a shock with a component in an axial direction.

Advantageously, as any impacts from the oscillating mass 23 are made on the field of the ring, if they generate marks or scratches, these are not visible or are not very visible to the naked eye, insofar as said field has a relatively small transverse dimension, typically in the order of several tenths of millimetres.

The invention is suitable for horology movements including an oscillating mass 23 extending radially beyond the bridge assembly 22, as illustrated in FIGS. 1 and 2. Indeed, as shown in the side view of FIG. 2, the oscillating mass 23 is then cantilevered with respect to the ring 10, which can thus act as stop.

To achieve this, the ring 10 can be configured so as to extend axially beyond the bridge assembly 22, towards the oscillating mass 23, as shown in FIGS. 2 and 3.

The ring 10 includes fixing members 15, which make it possible to mechanically connect it to the horology movement 20 without a degree of freedom.

As shown in FIG. 1, in a preferred embodiment of the invention, the fixing members 15 of the ring 10 can extend from the second axial end 12. These fixing members 15 are intended to be engaged in housings 25 formed in the horology movement 20, and in particular in the plate 21 of the latter, so as to fix together the ring 10 and the horology movement 20.

In particular, in the preferred embodiment of the invention shown in FIGS. 1 to 3, each fixing member 15 has the form of a tongue, a first portion of which, referred to as the "proximal portion" 150, is oriented in an axial direction in a direction opposite the first end 11 of the ring 10 and a second portion of which referred to as the "distal portion" 151, connected to the proximal portion 150, extends in a radial plane of the ring 10 and towards the exterior of the latter.

Advantageously, the ring 10 is preferably configured so as to be in a constrained state when it is arranged around the horology movement 20 and each fixing member 15 is engaged in a housing 25. Thus, when arranged in this position, said ring 10 exerts clamping forces on the horology movement 20, which makes it possible to ensure said ring 10 is held in position relative to the horology movement 20, and thus considerably facilitate the fixing of the ring 10 on the horology movement 20. This technical effect is made possible due to the elastic property of the ring 10.

In particular, in the preferred embodiment of the invention, at least some of the distal portions 151 are adapted to exert clamping forces on the housing 25 in which they are intended to be engaged.

As shown in FIG. 1, in the preferred embodiment of the invention, the ring 10 includes three fixing members 15, one of which is arranged at each of the longitudinal ends of the ring 10, on either side of the axial kerf 14, and one of which is arranged diametrically opposite said axial kerf 14.

Thus, the fixing points of the ring 10 are distributed in a balanced manner around the horology movement 20.

Advantageously, as shown in FIG. 2 in particular, the fixing members 15 are dimensioned such that the second end 12 of the ring 10 is arranged at a distance from the plate 21, so that it is ensured that the distal portions 151 of the fixing members 15 bear against the housings 25.

This arrangement facilitates the fixing of the ring 10 on the horology movement 20.

The plate 21 includes a face referred to as the "lower face" 210 oriented towards the bridge assembly 22, opposite a face preferred to as the "upper face".

In the preferred embodiment of the invention, as shown in FIGS. 2 and 3, the plate 21 of the horology movement 20 extends radially beyond the bridge assembly 22 and forms, by a peripheral portion of its lower face 210, a radial shoulder with respect to the bridge assembly 22.

The housings 25 are made on this peripheral portion of the lower face 210 of the plate 21.

The distal portions 151 of the fixing members 15 are preferably welded, for example by a laser welding method, to the housings 25 in which they are engaged.

Alternatively, the distal portions 151 can be bonded to the housings 25 or are assembled by press fit to said housings 25.

In other embodiments of the invention, the distal portions 151 can be fixed to the housings 25 by elastic interlocking.

In yet further embodiments of the invention, the distal portions 151 can include a through hole allowing the engagement of a screw intended to cooperate with a threaded hole which the housings 25 of the plate 21 include. In an alternative embodiment which does not include housings 25, the screws cooperate with threaded holes made on the lower face 210 of the plate 21 or at the bottom of counterbores intended to embed the screw heads.

Alternatively, it is also possible that the distal portions 151 include a through hole allowing the engagement of a nail intended to be driven into the plate 21.

Furthermore, as shown in FIGS. 1 to 3, the ring 10 comprises a chamfer 16 at the junction between the first axial end 11 and each of its longitudinal ends. In other words, the chamfers 16 are each arranged opposite to a fixing member 15.

This feature makes it possible to avoid any risk that the oscillating mass 23 may strike a sharp angle or an edge of the ring 10, which could impair the proper functioning of the horology movement 20.

It should be noted that although in the embodiment shown in FIGS. 1 to 3, the ring 10 has a tubular shape of a revolution cylinder, in other embodiments not shown in the figures, it can have other tubular forms. For example, it can include a cross-section with an elliptical shape, polygonal shape or any other suitable shape corresponding to the shape of the circumference of the cross-section of a bridge assembly 22 of a horology movement 20 to be protected.

Furthermore, in other embodiments not shown in the figures, the fixing members 15 can be as described above, except that they extend towards the interior of the ring 10 and not towards the exterior. In addition, in this embodiment, the fixing members 15 can cooperate with housings 25 with a corresponding form made in bridges 22 or in the plate 21.

In a further embodiment of the invention, the fixing members 15 can be in the form of a relief, formed for example by an annular boss oriented towards the inside of the ring 10 and extending between the longitudinal ends of the ring 10. The relief is then intended to cooperate with a groove made in the periphery of the bridge assembly 22.

In a further embodiment of the invention, the fixing members 15 may have the form of a radial collar extending from the second axial end 12 of the ring body 10, towards the exterior of the ring 10, said fixing members 15 as well as the ring body 10 being intended to be fixed by press fit between the horology movement 20 and the middle.

Alternatively, the collar is fixed by bonding to the plate 21.

Regardless of the embodiments of fixing members 15, the plate 21 can include threaded holes on its lower face 210 provided to receive fixing screws intended to fix the ring 10 against the horology movement 20. Alternatively, fixing flanges are also possible.

In other embodiments of the invention, the fixing members 15 of the ring 10 can be formed by tabs extending axially from the second axial end 12 of the ring body 10, said tabs intended to engage in holes passing through the plate 21 such that their free end opens beyond said holes in order to be folded back against the upper face of the plate 21.

In other embodiments of the invention, the body of the ring 10 includes through holes provided respectively for receiving pins or studs extending radially from the bridge assembly 22 of the horology movement 20.

The invention claimed is:

1. A horology movement comprising:

a bridge assembly;

a cage formed by a plate onto which the bridge assembly is fixed, said plate forming a radial shoulder with respect to the bridge assembly by a lower face;

an oscillating mass which is rotatable with respect to said cage and extending radially beyond the bridge assembly; and a ring made from a material having ferromagnetic properties and including a tubular body extending between a first and a second axial end, wherein said ring is configured to encircle the bridge assembly and to extend axially towards the oscillating mass, and being adapted to form, by the first axial end, a stop limiting the angular displacement, about a radial axis, of the oscillating mass, wherein said ring includes a plurality of fixing members extending from the second axial end, engaged in housings formed in the lower face to fix the ring with respect to said horology movement, wherein the plurality of fixing members extend along a portion of the second axial end, wherein the ring includes an axial kerf extending between the first and the second axial end of said ring, said axial kerf separating a first longitudinal end and a second longitudinal end of said ring, and wherein one of the plurality of fixing members is positioned immediately adjacent the axial kerf at the first longitudinal end of the ring, and one of the plurality of fixing members is positioned immediately adjacent the axial kerf at the second longitudinal end of the ring.

2. The horology movement according to claim 1, wherein the axial kerf extends from one of the first or second axial ends to the other.

3. The horology movement according to claim 1, wherein the axial kerf extends from the second axial end to the first axial end, a bridge of material connecting the two longitudinal ends of the ring to one another at the first axial end.

4. The horology movement according to claim 1, wherein the ring has elastic properties and is configured to be in a mechanically constrained state when the fixing members are engaged in the housings, so that said fixing members exert clamping forces against said housings respectively.

5. The horology movement according to claim 1, wherein each fixing member has the shape of a tongue, a first portion of which, referred to as the proximal portion, is oriented in an axial direction in a direction opposite the first axial end of the ring and a second portion of which, referred to as the distal portion, connected to the proximal portion, extends in a radial plane of the ring and towards the exterior of the latter.

6. The horology movement according to claim 1, wherein one of the plurality of fixing members is arranged diametrically opposite the axial kerf.

7. The horology movement according to claim 1, wherein one of the plurality of fixing members is arranged at each of the longitudinal ends of the ring.

8. The horology movement according to claim 1, wherein the ring comprises a chamfer at the junction between its first axial end and each of its longitudinal ends.

9. The horology movement according to claim 1, wherein the fixing members are welded to the housings.

10. The horology movement according to claim 1, wherein the fixing members are bonded to the housings.

11. The horology movement according to claim 1, wherein the fixing members cooperate with the housings by elastic interlocking.

* * * * *